US009445958B2

(12) United States Patent
Hansen et al.

(10) Patent No.: US 9,445,958 B2
(45) **Date of Patent: *Sep. 20, 2016**

(54) MANUAL WHEELCHAIR SYSTEM FOR IMPROVED PROPULSION AND TRANSFERS

(71) Applicant: DEPARTMENT OF VETERANS AFFAIRS, TECHNOLOGY TRANSFER PROGRAM [US/US], Washington, DC (US)

(72) Inventors: Andrew H. Hansen, Washington, DC (US); Gary D. Goldish, Washington, DC (US)

(73) Assignee: DEPARTMENT OF VETERANS AFFAIRS, TECHNOLOGY TRANSFER PROGRAM, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/776,642

(22) PCT Filed: Mar. 7, 2014

(86) PCT No.: PCT/US2014/022080

§ 371 (c)(1),
(2) Date: Sep. 14, 2015

(87) PCT Pub. No.: WO2014/159128

PCT Pub. Date: Oct. 2, 2014

(65) Prior Publication Data

US 2016/0038355 A1 Feb. 11, 2016

Related U.S. Application Data

(63) Continuation of application No. 13/827,840, filed on Mar. 14, 2013, now Pat. No. 8,905,421.

(51) Int. Cl.
*B62M 1/14* (2006.01)
*A61G 5/02* (2006.01)

(52) U.S. Cl.
CPC ............... *A61G 5/024* (2013.01); *A61G 5/026* (2013.01); *A61G 5/027* (2013.01); *Y10T 74/20834* (2015.01); *Y10T 74/20864* (2015.01)

(58) Field of Classification Search
CPC ....... A61G 5/022; A61G 5/024; A61G 5/026
USPC ...................... 280/250.1, 304.1; 74/552, 557
See application file for complete search history.

(56) References Cited

U.S. PATENT DOCUMENTS 4,422,660 A * 12/1983 Costello .................. A61G 5/10 280/250.1

(Continued)

FOREIGN PATENT DOCUMENTS

| | | | |
|---|---|---|---|
| CN | 201719455 | U | 1/2011 |
| JP | 2003-265537 | A | 9/2003 |
| JP | 2012-143519 | A | 8/2012 |

OTHER PUBLICATIONS

International Search Report and Written Opinion of the International Searching Authority dated Jun. 19, 2014 and issued by the Korean Intellectual Property Office for International Application No. PCT/US2014/022080.

*Primary Examiner* — Jacob Knutson
(74) *Attorney, Agent, or Firm* — Procopio, Cory, Hargreaves & Savitch LLP

(57) ABSTRACT

A manual wheelchair including a frame, a drive wheel connected to the frame, having a first axis of rotation and configured to rotate relative to the frame, a push rim connected to the frame, having a second axis of rotation extending substantially parallel to the first axis of rotation of the drive wheel and configured to rotate relative to the frame, wherein the second axis of rotation of the push rim is offset from the first axis of rotation of the drive wheel in a direction orthogonal to the first axis of rotation of the drive wheel, and a transmission configured to transmit rotation of the push rim to rotation of the drive wheel. Additionally, the wheelchair may also include multispeed fixed-gear hubs for propulsion on different terrain and removable or rotatable push rims for easier transfers.

17 Claims, 10 Drawing Sheets

(56) References Cited

U.S. PATENT DOCUMENTS

| | | | | |
|---|---|---|---|---|
| 5,482,305 | A * | 1/1996 | Jeffries | A61G 5/023 280/250.1 |
| 6,257,608 | B1 * | 7/2001 | Hanson | A61G 5/026 280/242.1 |
| 6,419,260 | B1 * | 7/2002 | Kuroda | A61G 5/08 280/304.1 |
| 2009/0051139 | A1 | 2/2009 | Kylstra et al. | |
| 2009/0295119 | A1 | 12/2009 | Bloswich et al. | |

* cited by examiner

MANUAL WHEELCHAIR SYSTEM FOR IMPROVED PROPULSION AND TRANSFERS

BACKGROUND

1. Field of the Invention

The purpose of the invention is to provide a wheelchair system that allows for independent positioning of the push rims and drive wheels, allowing for improved stability and improved shoulder biomechanics. The approach also allows for the addition of multispeed fixed-gear hubs for improved propulsion on sloped surfaces and allows for removal or repositioning of the push rims out of the way for easier transfers in and out of the wheelchair.

2. Related Art

The most common form of a manual wheelchair 100 utilizes a push rim 110 connected directly to the drive wheels 120 as shown in FIG. 1. The wheelchair user is able to propel the wheelchair 100 by pushing the push rims 110 with their hands, thereby rotating the wheel an equal angle and translating the chair forward. The common wheelchair is elegant in its simplicity. However, the inherent mechanical coupling of the push rim 110 and the wheel 120 require that they be placed in the same fore-aft position, which may lead to reduced stability of the wheelchair and/or shoulder problems. In setup of the common wheelchair, the clinician must balance concerns of shoulder biomechanics and stability of the wheelchair. On one hand, the clinician would like to move the push rims forward to promote a better positioning of the shoulders for propulsion. On the other hand, the axle of the wheels 120 must remain behind the center of gravity 130 to reduce the likelihood the wheelchair 100 will tip over backward. A common approach is to move the push rim/wheel combination 110/120 as far forward as possible while still maintaining a stable base 150 of support of the wheelchair by positioning the drive wheel 120 and front casters 140 to frame the center of gravity 130 in fore/aft directions.

The positioning of the push-rim/wheel 110/120 combination in common wheelchairs leads to difficulties in transfers (transferring in and out of the wheelchair 100). For example, the user must position the wheelchair at an angle with a bed 200 or other transfer surface in order to use a transfer board 210 (see FIG. 2). Without a transfer board, the person must elevate their body a significant distance to clear the wheel of the wheelchair (FIGS. 3A, 3B).

Therefore, what is needed is a system and method that overcomes these significant problems found in the conventional systems as described above.

SUMMARY

Described herein is a new manual wheelchair system that decouples the push rims from the drive wheels of the wheelchair and reconnects the push rims to the drive wheels using a belt drive or chain drive, thus allowing for optimal stability and better shoulder positioning for propulsion. The push rims are also removable or rotatable for easier transfers. The wheelchair can also include multispeed fixed-gear hubs for easier propulsion on different terrain. The wheelchair advantageously reduces shoulder problems that are common in persons who use manual wheelchairs while maintaining optimal stability.

Other features and advantages of the present invention will become more readily apparent to those of ordinary skill in the art after reviewing the following detailed description and accompanying drawings.

BRIEF DESCRIPTION OF THE DRAWINGS

The structure and operation of the present invention will be understood from a review of the following detailed description and the accompanying drawings in which like reference numerals refer to like parts and in which.

DETAILED DESCRIPTION

Certain implementations disclosed herein provide for a manual wheelchair that allows for optimization of stability and shoulder biomechanics for individual wheelchair users. For example, one apparatus disclosed herein provides a wheelchair having a drive wheel rotatable about a first axis of rotation, a push rim rotatable about a second axis of rotation, which is offset from the first axis of rotation, and a transmission coupling the push rim to the drive wheel.

Additionally, some implementations disclosed herein provide for a manual wheelchair that allows for the positioning of the push rim to allow transfer into and out of the wheelchair. For example, one apparatus disclosed herein provides a wheelchair having a push rim repositioning mechanism that allows the push rim to be rotated between a propulsion position and a transfer position.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 4A:
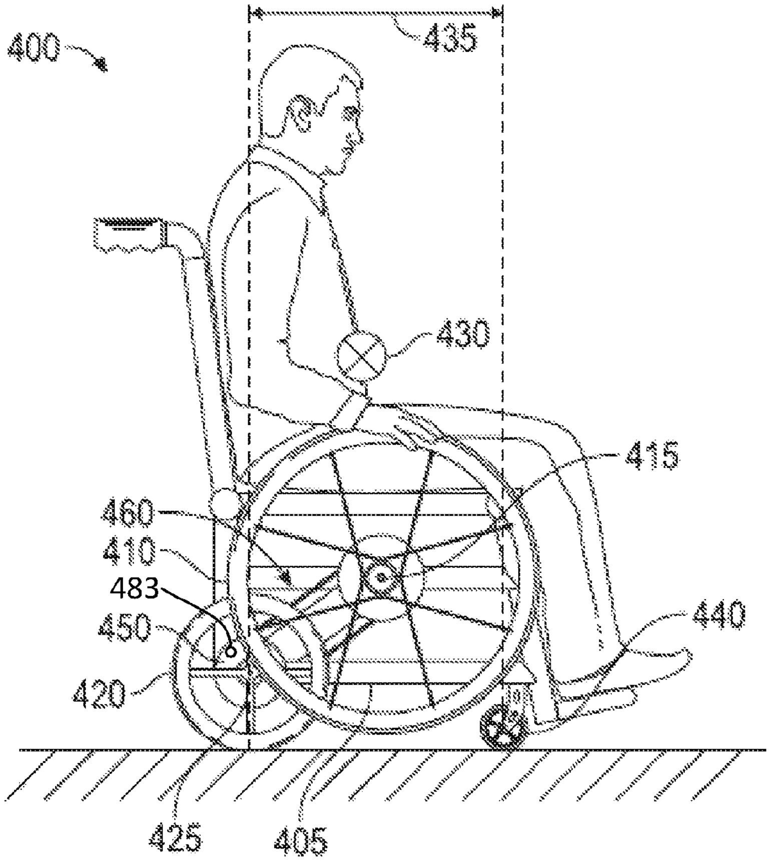
FIGS. 4A-4D are diagrams illustrating an example wheelchair with a push rim capable of being rotated backward and out of the way for transfers according to a first implementation of the present application.
Figure 4B:
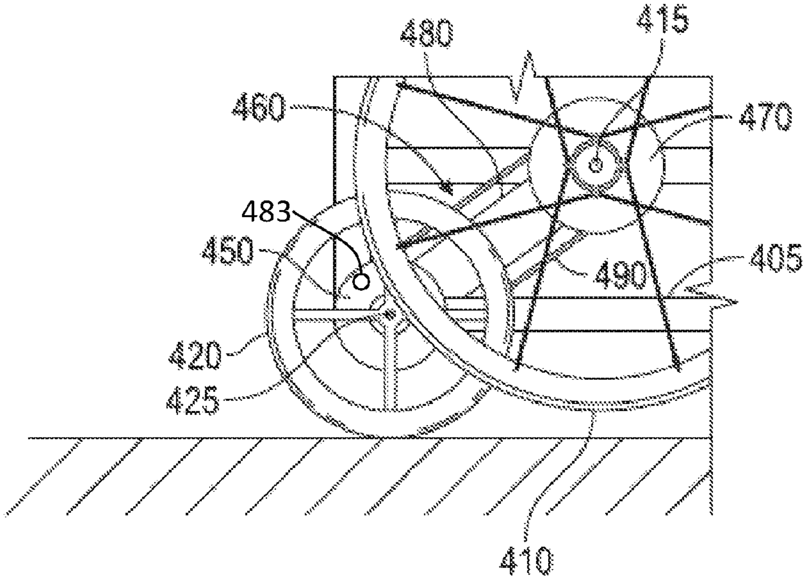
Figure 4C:
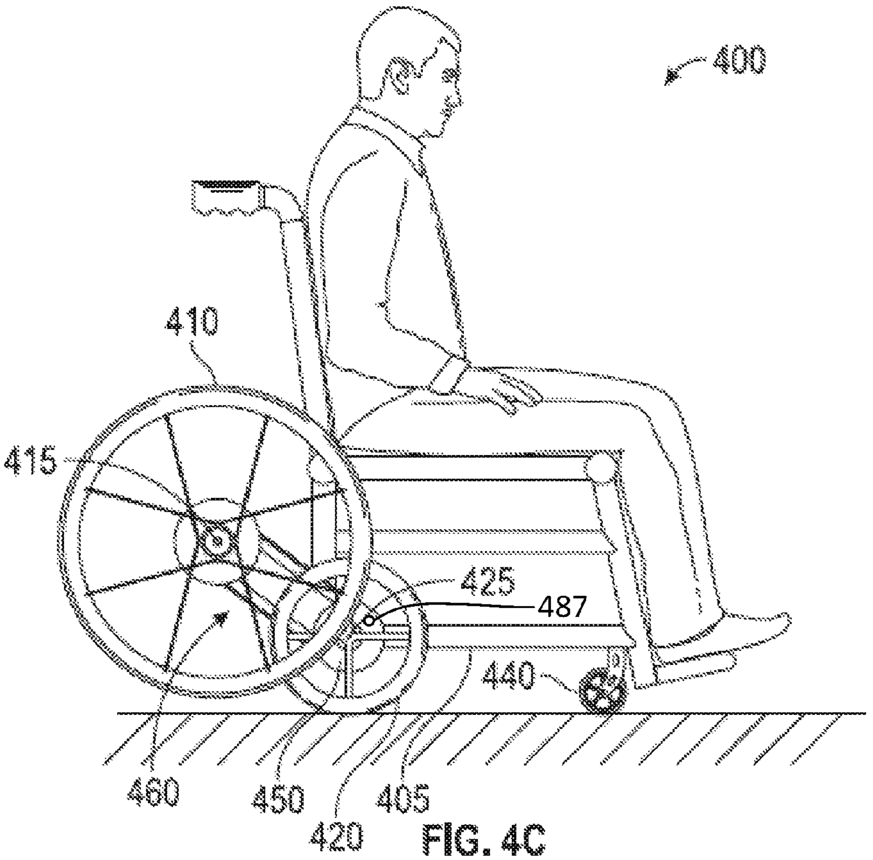
Figure 4D:
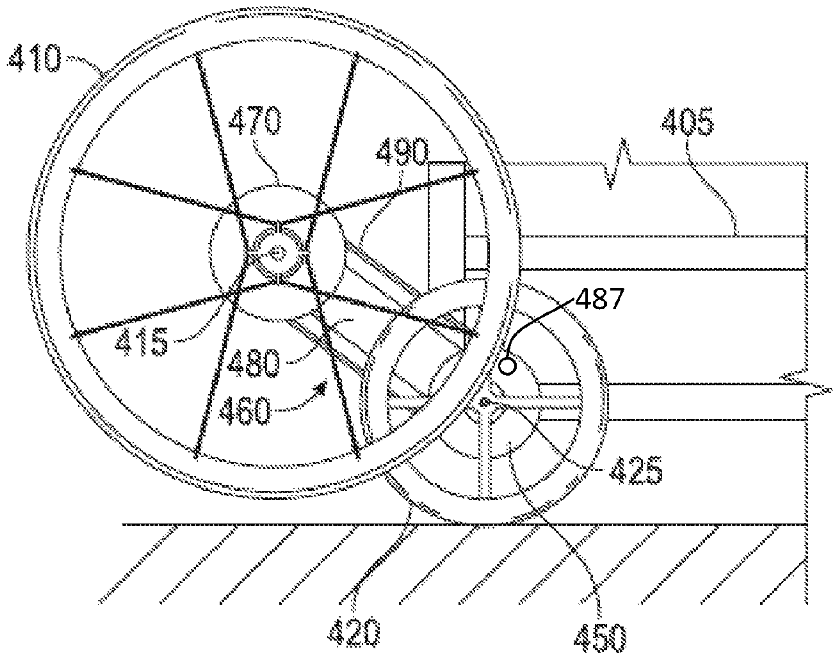

FIGS. 4A-4D are diagrams illustrating an example wheelchair with a push rim capable of being rotated backward and out of the way for transfers according to a first implementation of the present application. More specifically, FIG. 4A illustrates the wheelchair with the push rim rotated forward into a propulsion position. Further, FIG. 4B illustrates an enlarged view of the push rim relocation mechanism in the propulsion position. Further, FIG. 4C illustrates the wheelchair with the push rim rotated backward into a transfer position. Further, FIG. 4D illustrates an enlarged view of the push rim relocation mechanism in the transfer position.

In this implementation, the wheelchair 400 includes a frame 405, a rotatable push rim 410 connected to the frame 405 and a drive wheel 420 connected to the frame 405. The wheelchair 400 may also include caster wheels 440 located in front of the drive wheel 420. The caster wheels 440 and the drive wheels 420 collectively form the base of support 435 of the wheelchair. In order to provide a stable ride for the user, it may be preferable that caster wheels 440 and the drive wheels be positioned such that the user's center of gravity 430 is located directly above the base of support 435, rather than in front of or behind the base of support 435.

As shown in FIGS. 4A-4D, the axis of rotation 425 of the drive wheel 420 is offset from the axis of rotation 415 of the push rim. Thus, instead of being directly coupled to each other, the push rim 410 and drive wheel 420 are connected by a transmission 460. The transmission 460 may include a drive gear/hub 450 coupled to drive wheel 420, a push rim gear/hub 470 coupled to the push rim 410, and a chain or belt 490 connected to the drive gear/hub 450 and the push rim gear/hub 470.

Thus, de-coupling the fore-aft position of the push rims 410 and drive wheels 420 may allow a clinician to place the drive wheels 420 in their optimal position to provide a stable base of support 435 while still allowing the person to do "wheelies" if needed (to go over curbs and other thresholds). Also, the position of the push rims 410 can be set to promote the best positioning of the wheelchair 400 user's shoulders. A potential aspect of this more forward positioning of the push rims 410 is a reduction in shoulder pain resulting from manual propulsion of the wheelchair. In other words, de-coupling of the push rims 410 and drive wheels 420 may allow the clinician to place the push rims 420 in front of the user's center of gravity 430 as shown in FIGS. 4A-4D, potentially improving mechanical efficiency without sacrificing wheelchair stability.

Additionally, the use of the transmission 460 with the belts or chains 490 may allow the wheelchair to also incorporate into one or both of the drive gear/hub 450 and the push rim gear/hub 470 a multispeed fixed-gear hub such as the Sturmey-Archer S3X fixed-gear hub. In such implementations, the ability to switch to higher or lower speeds may allow the wheelchair user to go faster on smooth even terrain and to require less torque and forces on the shoulders to go up inclined terrain.

Figure 1:
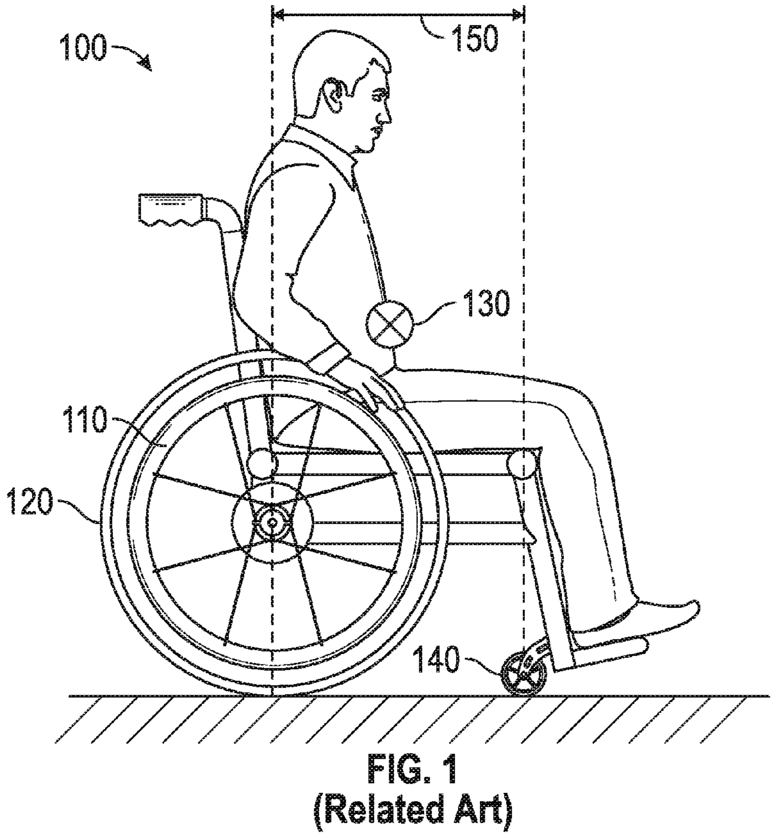
FIG. 1 (Related Art)
FIG. 1 is a diagram illustrating an example related art wheelchair.
Figure 2:
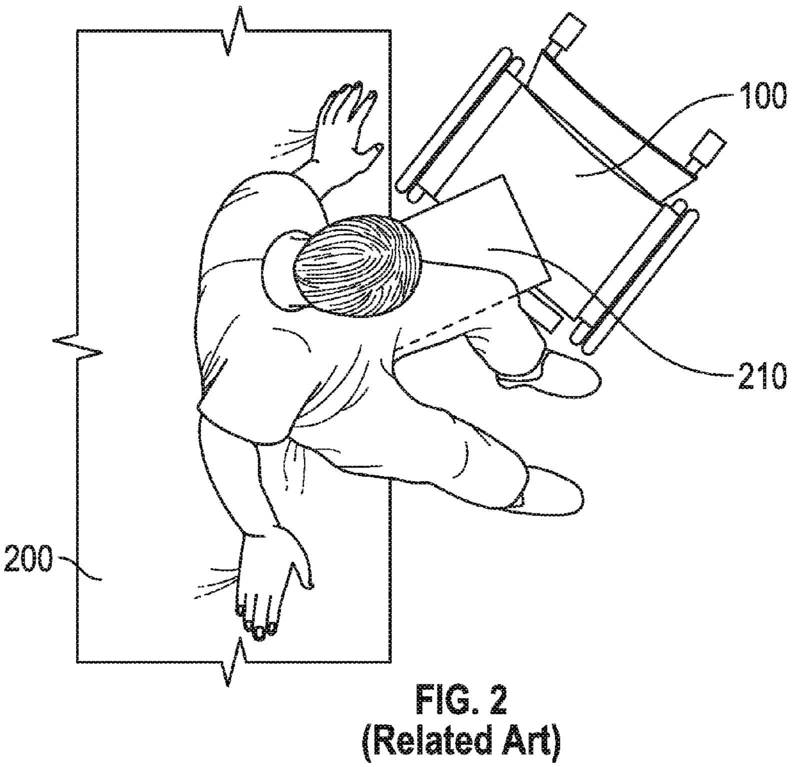
FIG. 2 (Related Art)
FIG. 2 is a diagram illustrating an example related art wheelchair transfer with a transfer board.
Figure 3A:
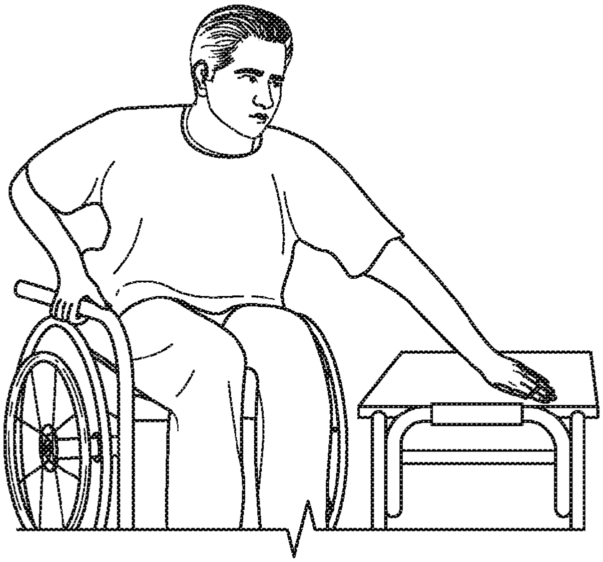
FIG. 3A (Related Art)
FIGS. 3A and 3B are diagrams illustrating an example related art wheelchair transfer without a transfer board.
Figure 3B:
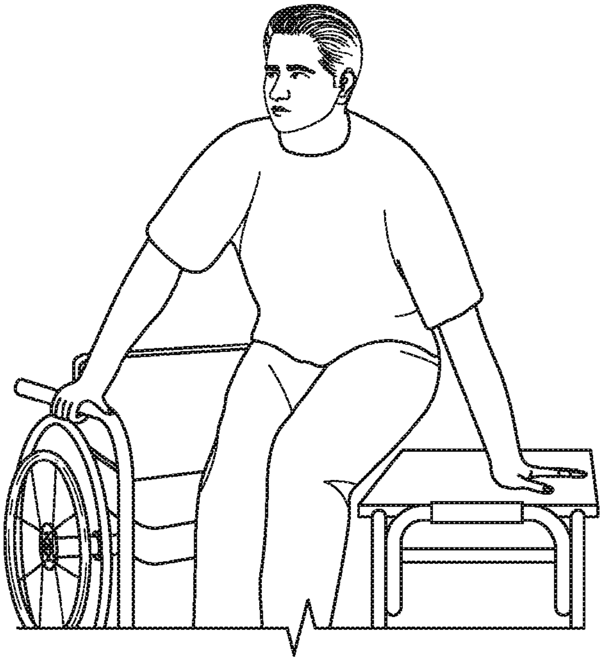
FIG. 3B (Related Art)

Additionally, in some implementations, the wheelchair 400 also includes a push rim repositioning member 480 that allows the push rim 410 to be repositioned to allow a user to transfer into and out of wheelchair 400 without having to lift himself over the push rim as shown in FIGS. 3A and 3B above. In FIGS. 4A-4D, the repositioning member 480 is a swing arm rotatably mounted to the frame 405 and configured to rotate about the axis of rotation 425 of the drive train. As shown, the push rim gear/hub 470 and push rim 410 are located at a first end of the swing arm 480 and the drive wheel gear/hub 450 is located at a second end of the swing arm 480 and the belt/chain 490 extends along the length of the swing arm. As shown in FIGS. 4A and 4B, the swing arm 480 can be rotated forward to position the push rim 410 forward of a user's shoulders to allow the propulsion of the wheel chair by the user (known as the propulsion position).

As shown in FIGS. 4C and 4D, the swing arm 480 can be rotated backward to position the push rim 410 behind a user's shoulders to allow the user to transfer into and out of the wheelchair.

Additionally, in some embodiment, a locking mechanism 483 may be provided to releasably hold the push rim repositioning member 480 (swing arm) in the propulsion position shown in FIGS. 4A and 48. Further, a second locking mechanism 487 or hard stop may also be provided to releasably hold or limit the rearward rotation of the push rim repositioning member 480 (swing arm) in the transfer position shown in FIGS. 4C and 40.

Though various aspects of this embodiment are shown in the figures and discussed above, implementations of this application are not limited to these aspects and alternative implementations are discussed below.

Figure 5A:
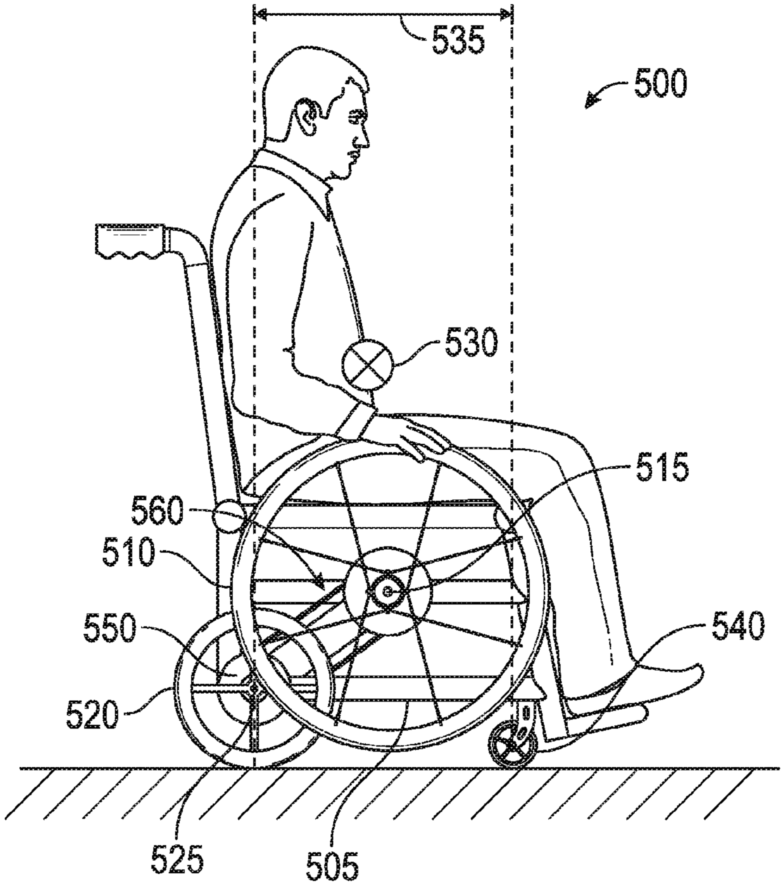
FIGS. 5A-5D are diagrams illustrating an example wheelchair with a push rim capable of being removed and placed out of the way for transfers according to a second implementation of the present application.
Figure 5B:
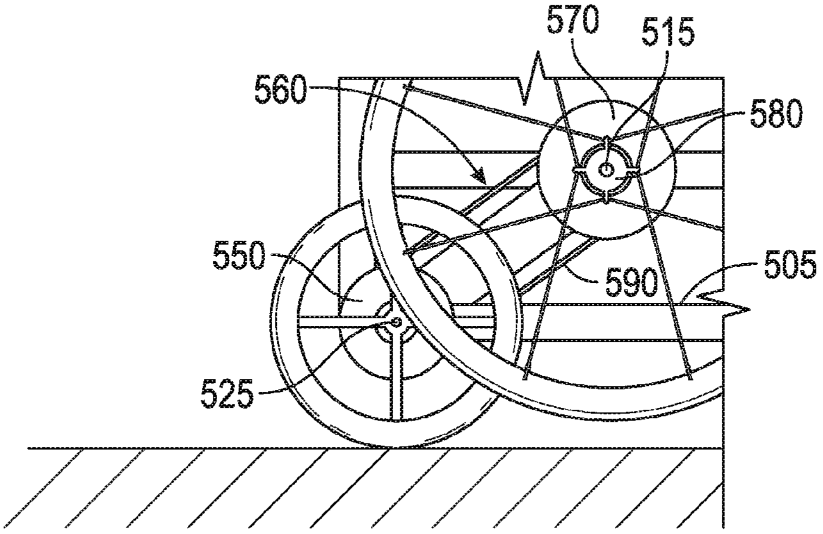
Figure 5C:
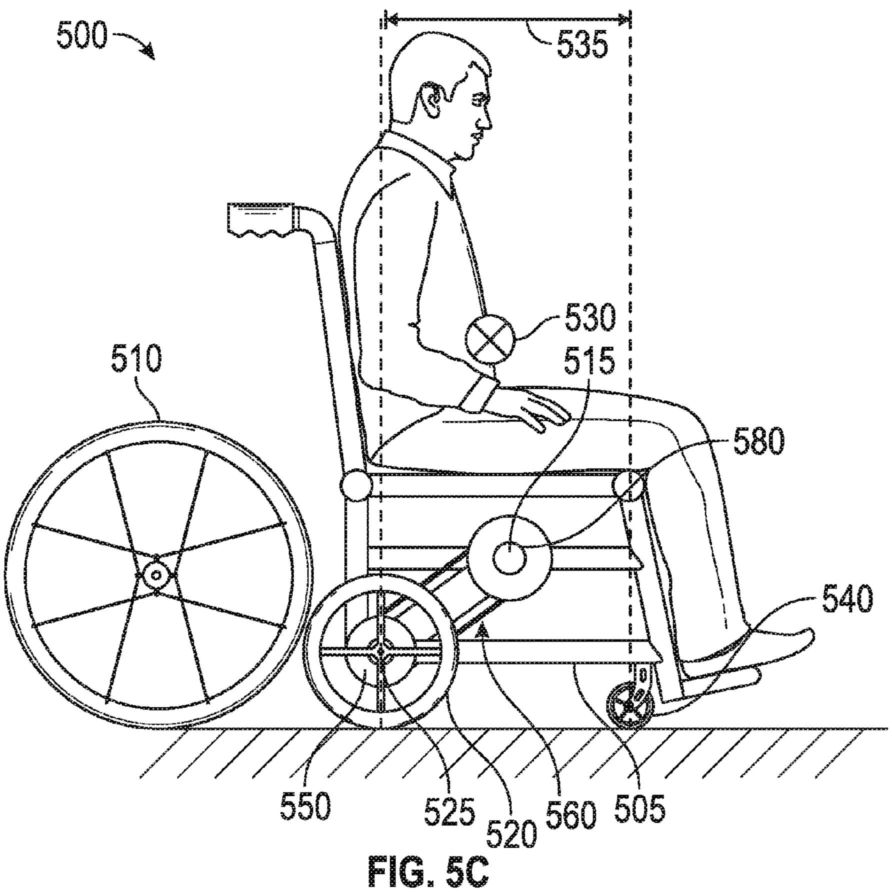
Figure 5D:
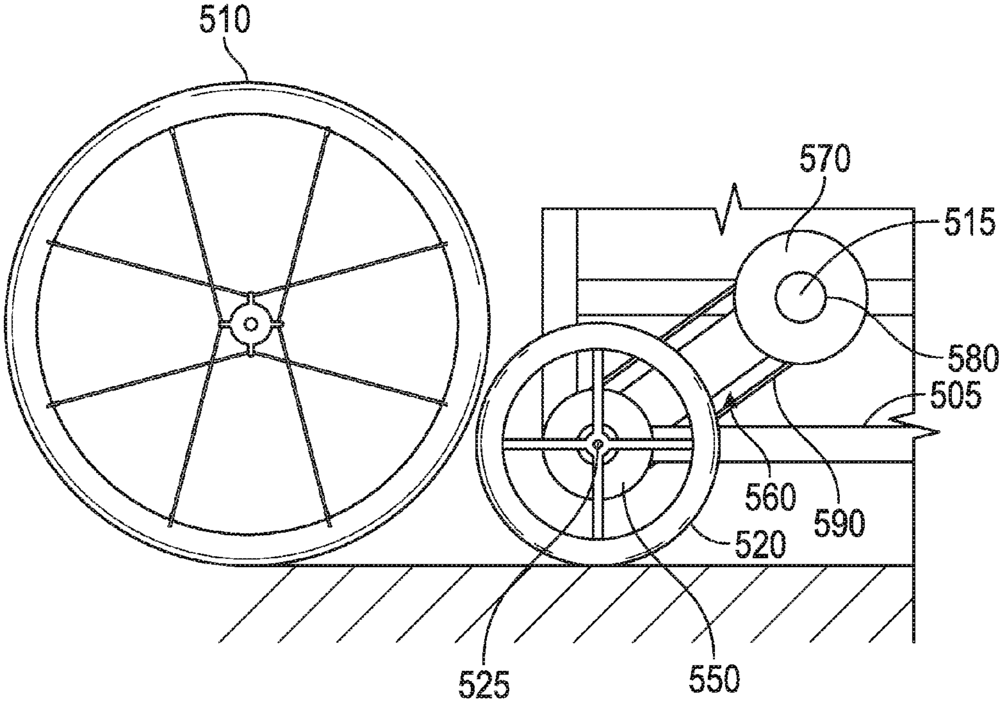

FIGS. 5A-5D are diagrams illustrating an example wheelchair with a push rim capable of being removed and placed out of the way for transfers according to a second implementation of the present application. More specifically, FIG. 5A illustrates the wheelchair with the push rim attached to the wheelchair in a propulsion position. Further, FIG. 5B illustrates an enlarged view of the push rim relocation mechanism with the push rim attached in the propulsion position. Further, FIG. 5C illustrates the wheelchair with the push rim disconnected from the wheelchair and repositioned for a transfer. Further, FIG. 5D illustrates an enlarged view of the push rim removed for a transfer.

As with the implementation discussed above, in this implementation the wheelchair 500 includes a frame 505, a rotatable push rim 510 connected to the frame 505 and a drive wheel 520 connected to the frame 505. The wheelchair 500 may also include caster wheels 540 located in front of the drive wheel 520. Again, the caster wheels 540 and the drive wheels 520 collectively form the base of support 535 of the wheelchair. In order to provide a stable ride for the user, it may be preferable that caster wheels 540 and the drive wheels be positioned such that the user's center of gravity 530 is located directly above the base of support 535, rather than in front of or behind the base of support 535.

As shown in FIGS. 5A-5D, the axis of rotation 525 of the drive wheel 520 is offset from the axis of rotation 515 of the push rim 510. Thus, instead of being directly coupled to each other, the push rim 510 and drive wheel 520 are connected by a transmission 560. The transmission 560 may include a drive gear/hub 550 coupled to drive wheel 520, a push rim gear/hub 570 coupled to the push rim 510, and a chain or belt 590 connected to the drive gear/hub 550 and the push rim gear/hub 570.

Again, de-coupling the fore-aft position of the push rims 510 and drive wheels 520 may allow a clinician to place the drive wheels 520 in their optimal position to provide a stable base of support 535 while still allowing the person to do "wheelies" if needed (to go over curbs and other thresholds). Also, the position of the push rims 510 can be set to promote the best positioning of the wheelchair 500 user's shoulders. A potential aspect of this more forward positioning of the push rims 510 is a reduction in shoulder pain resulting from manual propulsion of the wheelchair. In other words, de-coupling of the push rims 510 and drive wheels 520 may allow the clinician to place the push rims 520 in front of the user's center of gravity 530 as shown in FIGS. 5A-5D, potentially improving mechanical efficiency without sacrificing wheelchair stability.

Again, the use of the transmission 560 with the belts or chains 590 may allow the wheelchair to also incorporate into either one or both of the drive gear/hub 550 and the push rim gear/hub 570 a multi-speed fixed-gear hub such as the Sturmey-Archer S3X fixed-gear hub, for example. In such implementations, the ability to switch to higher or lower speeds may allow the wheelchair user to go faster on smooth even terrain and to require less torque and forces on the shoulders to go up inclined terrain.

Additionally, in some implementations, the wheelchair 500 also includes a push rim repositioning member 580 that allows the push rim 510 to be repositioned to allow a user to transfer into and out of wheelchair 500 without having to lift himself over the push rim as shown in FIGS. 3A and 3B above. In the implementation shown in FIGS. 5A-5D, the repositioning member 580 is release mechanism that allows the push rim 510 to be disconnected from the frame 505. For example, a quick release mechanism could be used to allow the push rim 510 to be removably attached to the frame 505. As shown in FIGS. 5A and 5B, the release mechanism (push rim repositioning member 580) holds the push rim 510 forward of a user's shoulders to allow propulsion of the wheelchair by the user (known as the propulsion position). As shown in FIGS. 5C and 5D, the release mechanism (push rim repositioning member 580) allows the push rim 510 to be disconnected from the frame 505, and once disconnected, the push rim 510 can be placed behind a user's shoulders to allow the user to transfer into and out of the wheelchair.

Though various aspects of this embodiment are shown in the figures and discussed above, implementations of this application are not limited to these aspects and alternative implementations are discussed below.

Figure 6:
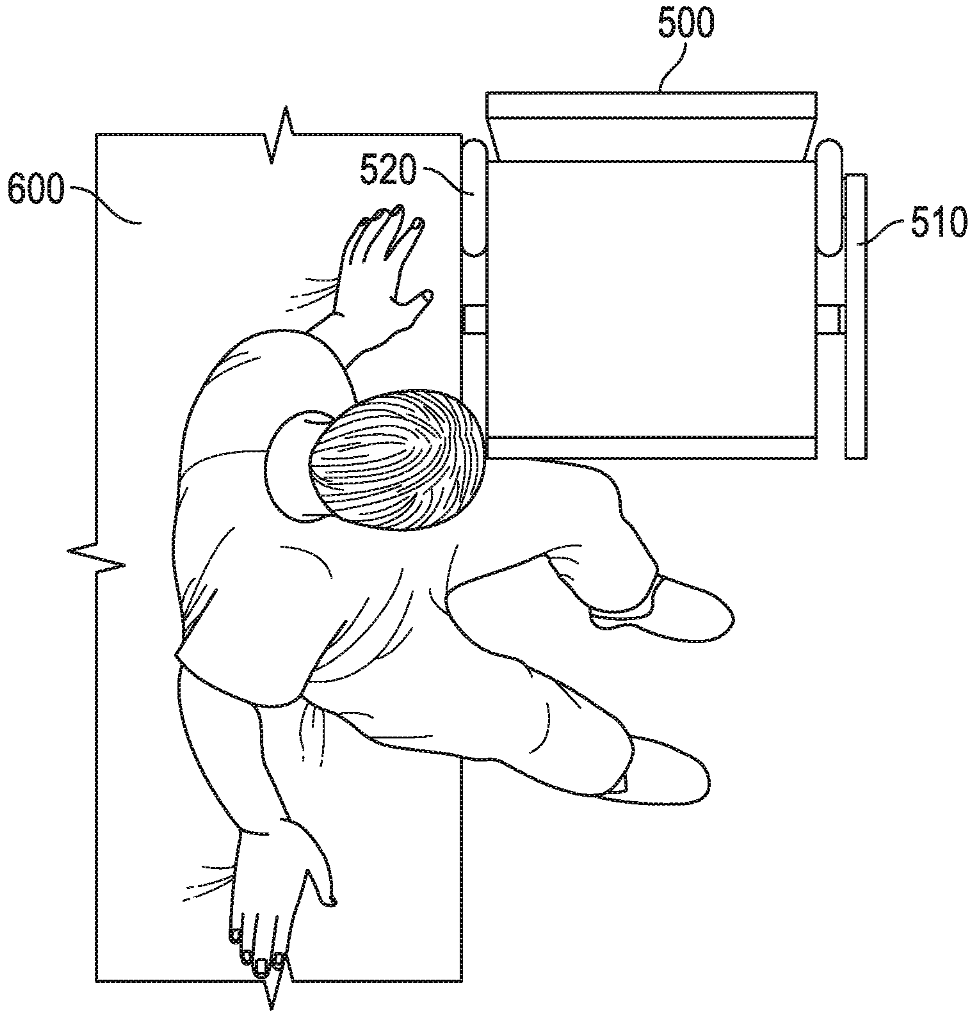
FIG. 6 is a block diagram illustrating an example transfer of a patient from a bed to a wheelchair according to an embodiment of the invention.

FIG. 6 is a block diagram illustrating an example transfer of a patient from a bed to a wheelchair according to an embodiment of the invention.

By incorporating a push rim reposition member, such as shown in the implementations of FIGS. 4A-4D and FIGS. 5A-5D, the wheelchair 500 can now be placed directly next to the bed 600 or other transfer surface, reducing the distance to transfer and also reducing the height to elevate the body since the user no longer needs to clear the wheel 520 or the push rim 510 or the combination.

Figure 7B:
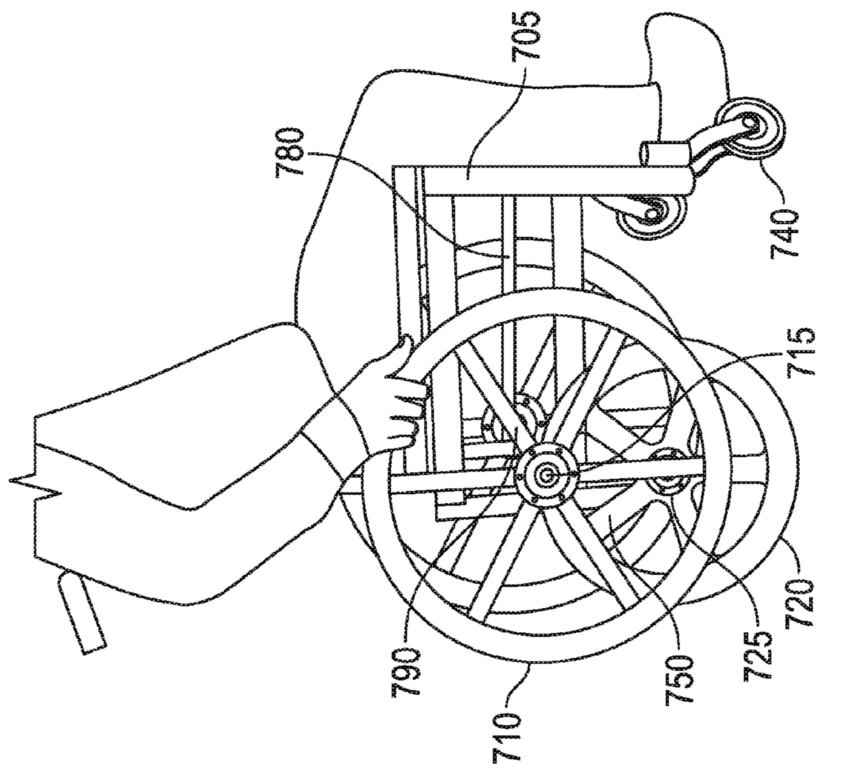
FIGS. 7A-7B are diagrams illustrating an example wheelchair with a push rim capable of being translated backward and out of the way for transfers according to a third implementation of the present application.
Figure 7A:
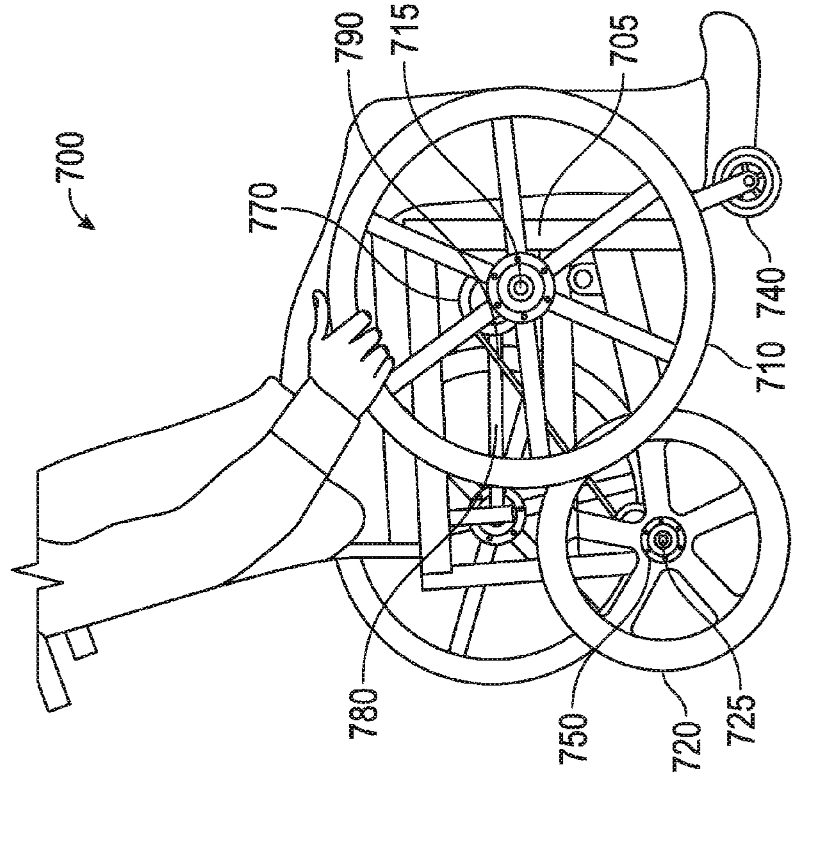

FIGS. 7A-7B are diagrams illustrating an example wheelchair with a push rim capable of being rotated backward and out of the way for transfers according to a third implementation of the present application. More specifically, FIG. 7A illustrates the wheelchair with the push rim to the wheelchair located in a propulsion position. Further, FIG. 7B illustrates the wheelchair with the push rim repositioned into a transfer position.

This implementation shown in FIGS. 7A and 7B may include features and elements similar to those discussed above with respect to the first and second implementations. Thus redundant descriptions thereof may be omitted. As with the implementations discussed above, in this implementation the wheelchair 700 includes a frame 705, a rotatable push rim 710 connected to the frame 705 and a drive wheel 720 connected to the frame 705. The wheelchair 700 may also include caster wheels 740 located in front of the drive wheel 720.

As shown in FIGS. 7A-7B, the axis of rotation 725 of the drive wheel 720 is offset from the axis of rotation 715 of the push rim. Thus, instead of being directly coupled to each other, the push rim 710 and drive wheel 720 are connected by a transmission (not specifically labeled in FIGS. 7A and 7B; individual components labeled). The transmission may include a drive gear/hub 750 coupled to drive wheel 720, a push rim gear/hub 770 coupled to the push rim 710, and a chain or belt 790 connected to the drive gear/hub 750 and the push rim gear/hub 770.

Again, de-coupling the fore-aft position of the push rims 710 and drive wheels 720 may allow a clinician to place the drive wheels 720 in their optimal position to provide a stable base of support while still allowing the person to do "wheelies" if needed (to go over curbs and other thresholds). Also, the position of the push rims 710 can be set to promote the best positioning of the wheelchair 700 user's shoulders. A potential aspect of this more forward positioning of the push rims 710 is a reduction in shoulder pain resulting from manual propulsion of the wheelchair. In other words, decoupling of the push rims 710 and drive wheels 720 may allow the clinician to place the push rims 720 in front of the user's center of gravity as shown in FIGS. 5A-5D, potentially improving mechanical efficiency without sacrificing wheelchair stability.

Again, the use of the transmission with the belts or chains 790 may allow the wheelchair to also incorporate a multi-speed fixed-gear hub to provide the ability to switch to higher or lower speeds and thereby allow the wheelchair user to go faster on smooth even terrain and to require less torque and forces on the shoulders to go up inclined terrain.

Additionally, in some implementations, the wheelchair 700 also includes a push rim repositioning member 780 that allows the push rim 710 to be repositioned to allow a user to transfer into and out of wheelchair 700 without having to lift himself over the push rim as shown in FIGS. 3A and 3B above. In FIGS. 7A-7B, the repositioning member 580 is a guide rail extending along the frame 705 that the push rim 710 can be slid along. Thus, the push rim 710 may be slidingly mounted to the guide rail (push rim repositioning mechanism 780) and repositioned at different portions along the length of the guide rail (push rim repositioning mechanism 780). As shown in FIG. 7A, the push rim 710 has been slid forward along the guide rail (push rim repositioning mechanism 780) to be located forward of a user's shoulders to allow the propulsion of the wheel chair by the user (known as the propulsion position). As shown in FIG. 7B, the push rim 710 has been slid backward along the guide rail (push rim repositioning mechanism 780) to be located behind or even with a user's shoulders to allow the user to transfer into and out of the wheelchair.

Additionally, in some implementations, a locking mechanism (not shown) may be provided to releasably hold the push rim 710 (swing arm) in the propulsion position located in front of the user's shoulders as shown in FIG. 7A. Further, a second locking mechanism (not shown) or hard stop may also be provided to releasably hold or limit the rearward movement of the push rim 710 in the transfer position shown in FIG. 7B. Additionally, in some embodiments, the transmission of the wheel chair may also include an idler sprocket (not shown), which can be used to maintain a fixed tension in the belt or chain 790.

Though various aspects of this embodiment are shown in the figures and discussed above, implementations of this application are not limited to these aspects and alternative implementations are discussed below.

Figure 8:
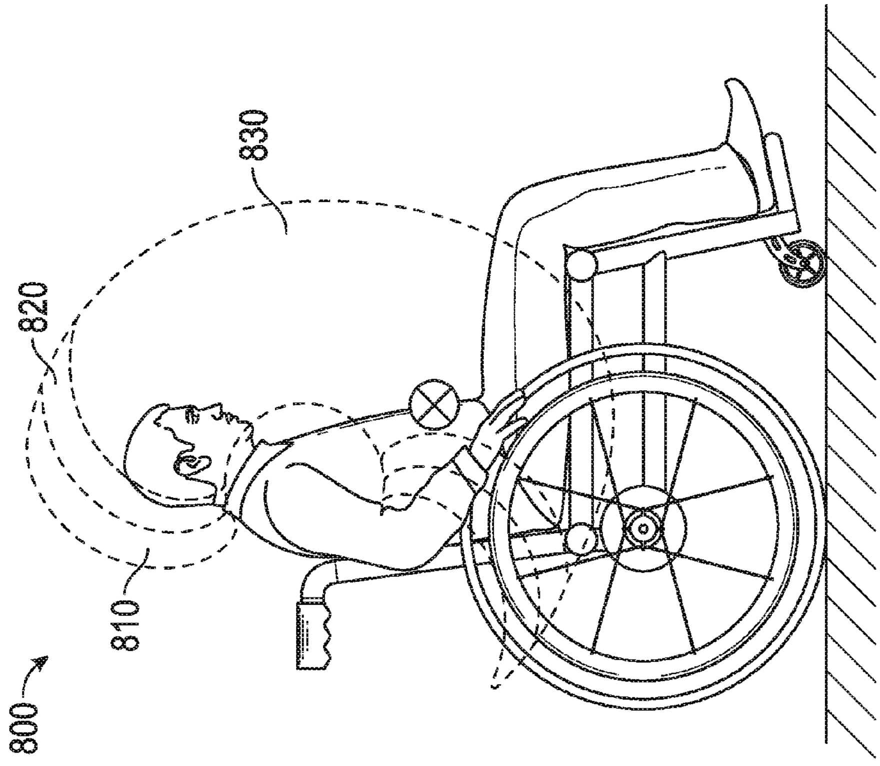
FIG. 8 (Related Art)
FIG. 8 is a diagram illustrating a user's range of motion laid over a diagram of an example related art wheelchair.
Figure 9:
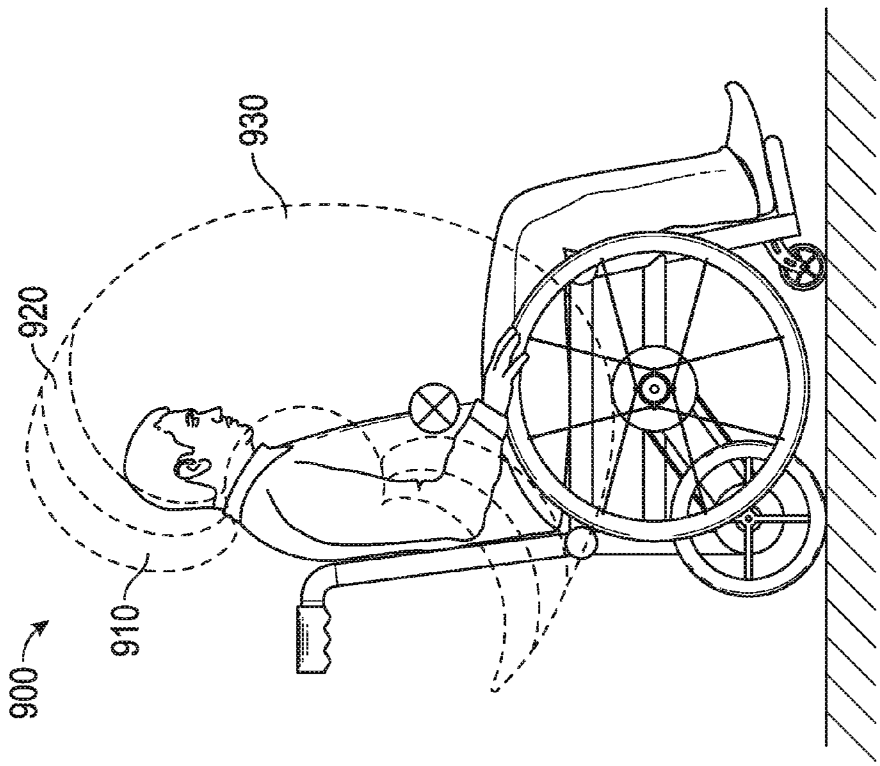
FIG. 9 is a diagram illustrating a user's range of motion laid over a diagram of a wheelchair according to an implementation of the present application.

FIG. 8 illustrates the reachable workspace of a user's wrist for different shoulder ranges of motion laid over a diagram of an example related art wheelchair 800 and FIG. 9 illustrates the reachable workspace of a user's wrist for different shoulder ranges of motion laid over a diagram of a wheelchair 900 according to an implementation of the present application. As discussed above, a problem with conventional wheelchairs relates to the positioning of the drive wheel/push rim assembly relative to the user's shoulders. Rearward placement of the drive wheel/push rim assembly can improve stability, but such placement can require a user to continually reach backward with shoulder extension and sometimes shoulder abduction. Use of the shoulders in excessive extension and in abduction are thought to be damaging for repeated use. Also, some users may have experienced reduced range of motion that can limit the propulsive force that can be generated by the user. FIGS. 8 and 9 illustrate a hypothetical user's range of motion laid over diagrams of a related art wheelchair 800 and a wheelchair 900 according to an implementation of the present application. Specifically, in FIGS. 8 and 9, regions 810, 910 represent a user with a full range of motion, regions 820, 920 represent a user with a slightly reduced range of motion, and regions 830, 930 represent a reduced range of motion. As shown in FIG. 8, in order to achieve and maximize the arc of propulsion by starting the application of torque at the upper surface of the push rim of the conventional wheel chair, the user needs to take his shoulders into large angles of extension (i.e. into region 810). However, by moving the push rims forward in an implementation according to the present application, the user may be able to apply a maximum arc of propulsion with less shoulder extension (i.e. outside region 910, and into regions 920, 930).

Figure 10A:
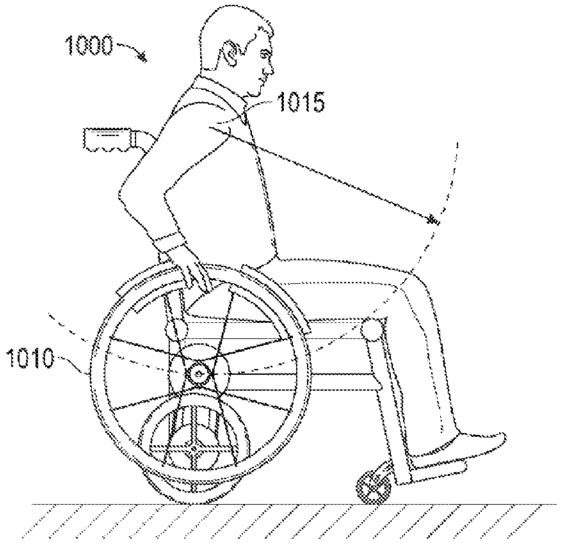
FIGS. 10A-10C are diagrams illustrating placement of a push rim at different positions along a wheelchair according to an implementation of the present application.
Figure 10B:
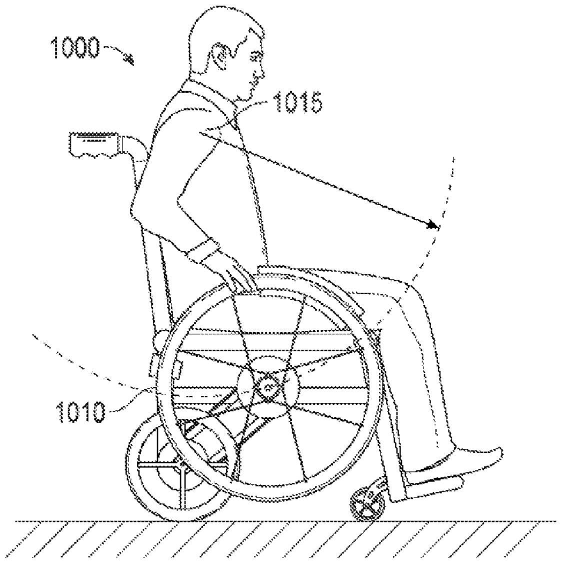
Figure 10C:
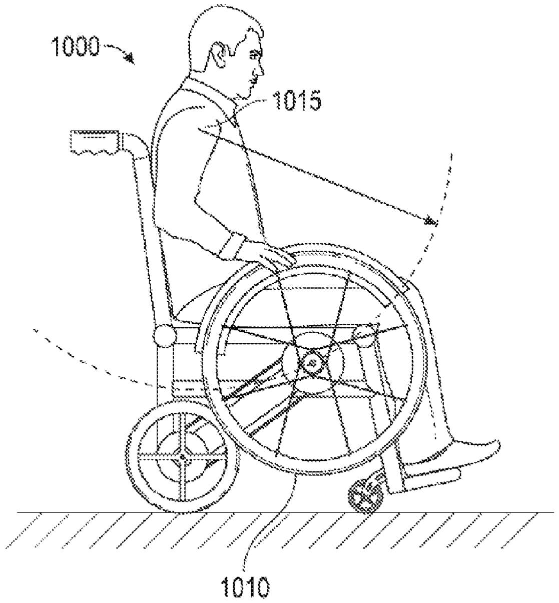

In the implementations discussed above, the push rim was shown being movable between a propulsion position and a transfer position. However, implementations of the present invention need not have only two positions. Instead, a wheelchair according to the present application may include a push rim repositioning mechanism configured to allow customizable placement of the push rim based on a user's specific physical dimensions and/or physical capabilities and/or the activities that the patient is involved in. FIGS. 10A-10C illustrate placement of a push rim at various positions along a wheelchair according to an implementation of the present application based on a user's range of motion. FIG. 10A illustrates the push rim 1010 of the wheelchair 1000 in position even with the user's shoulders 1015. FIG. 10B illustrates the push rim 1010 of the wheelchair 1000 rotated forward by 15 degrees with respect to the user's shoulders 1015. FIG. 100 illustrates the push rim 1010 of the wheelchair 1000 rotated forward by 15 degrees with respect to the user's shoulders 1015.

Those of skill in the art will appreciate that skilled persons can implement the described functionality in varying ways for particular applications, but such implementation decisions should not be interpreted as causing a departure from the scope of the invention. Also, in the various embodiments described above, the improvements to the push rim and drive wheels can be implements for a single side of the wheelchair or on both sides of the wheelchair.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly not limited.

The invention claimed is:

1. A manual wheelchair comprising:

a frame;

a drive wheel connected to the frame, having a first axis of rotation and configured to rotate relative to the frame;

a push rim connected to the frame, having a second axis of rotation extending substantially parallel to the first axis of rotation of the drive wheel and configured to rotate relative to the frame, wherein the second axis of rotation of the push rim is offset from the first axis of rotation of the drive wheel in a direction orthogonal to the first axis of rotation of the drive wheel;

a transmission configured to transmit rotation of the push rim to rotation of the drive wheel; and a push rim repositioning mechanism configured to allow the push rim to be repositioned relative to the drive wheel, the push rim repositioning mechanism comprising a guide rail attached to the frame and a push rim axle connected to the guide rail and configured to be movable along the guide rail, wherein the push rim is connected to the push rim axle and configured to rotate relative to the frame.

2. The manual wheelchair of claim 1, wherein the transmission comprises:

a first gear coupled to the drive wheel, a second gear coupled to the push wheel, and at least one of a belt or chain connecting the first gear to the second gear to transmit rotation of the second gear to the first gear.

3. The manual wheelchair of claim 1, wherein the push rim repositioning mechanism comprises a quick release mechanism configured to allow the push rim to be disconnected from the frame.

4. The manual wheel chair of claim 1, wherein the push rim repositioning mechanism comprises a swing arm connected to the frame at a first end and rotatable relative to the first axis of rotation, wherein the push rim is connected to a second end of the swing arm.

5. The manual wheel chair of claim 4, wherein the transmission comprises:

a first gear coupled to the drive wheel and disposed proximate the first end of the swing arm, a second gear coupled to the push rim and disposed proximate the second end of the swing arm, and at least one of a belt or chain connecting the first gear to the second gear to transmit rotation of the second gear to the first gear.

6. The manual wheelchair of claim 1, further comprising a locking mechanism configured to releasably lock the push rim axle in a fixed position along the guide rail.

7. The manual wheelchair of claim 1, wherein the transmission comprises:

a first gear coupled to the drive wheel;

a second year coupled to the push rim axle and the push rim; and at least one of a belt or chain connecting the first gear to the second gear to transmit rotation of the second gear to the first gear.

8. The manual wheelchair of claim 7, wherein the transmission further comprises an idler sprocket to maintain fixed tension in the at least one belt or chain during movement of the push rim axle along the guide rail.

9. A method for configuring a manual wheelchair, the manual wheelchair comprising a frame, a drive wheel connected to the frame, a push rim connected to the frame and offset from the drive wheel, and a transmission configured to transmit rotation of the push rim to rotation of the drive wheel, and a push rim repositioning mechanism including a guide rail attached to the frame and a push rim axle connected to the push rim and the guide rail, the push rim axle configured to move along the guide rail, the method comprising:

activating the push rim repositioning mechanism to release the connection between the push rim and the frame;

moving the push rim axle along the guide rail to move the push rim from a propulsion position to transfer position.

10. The method of claim 9, wherein activating the push rim repositioning mechanism comprises removing the push rim from the frame and placing the push rim proximate to the wheelchair.

11. The method of claim 10, wherein activating the push rim repositioning mechanism comprises releasing a locking mechanism to allow the push rim to move relative to the frame.

12. The method of claim 11, wherein moving the push rim comprises rotating the push rim relative to the drive wheel.

13. The method of claim 9, wherein the propulsion position of the push rim is determined based on a shoulder position of a user of the wheelchair.

14. The method of claim 13, wherein the propulsion position of the push rim is positioned to be located in front of the user's shoulders by a predetermined angle.

15. A manual wheelchair comprising:

a frame;

a drive wheel connected to the frame;

a push rim connected to the frame and configured to rotate relative to the frame, and means for repositioning the push rim relative to the drive wheel comprising a guide rail attached to the frame and a push rim axle connected to the push rim and the guide rail, the push rim axle configured to move along the guide rail.

16. The manual wheel chair of claim 15, further comprising a transmission configured to transmit rotation of the push rim to rotation of the drive wheel.

17. The manual wheelchair of claim 16, wherein the transmission comprises:

a first gear coupled to the drive wheel;

a second gear coupled to the push rim; and at least one belt or chain connecting the first gear to the second gear to transmit rotation of the second gear to the first gear.

* * * * *